United States Patent [19]

Otero

[11] Patent Number: 5,785,383
[45] Date of Patent: Jul. 28, 1998

[54] PORTABLE FOLDABLE BABY CHAIR

[76] Inventor: Armando Otero, 714 W. Virginia Ave., Tampa, Fla. 33603

[21] Appl. No.: 878,365

[22] Filed: Jun. 18, 1997

[51] Int. Cl.$^6$ ........................................ A47C 1/08
[52] U.S. Cl. .................. 297/255; 297/17; 297/378.12
[58] Field of Search ................... 297/255, 219.12, 297/256, 188.02, 188.01, 256.1, 17, 378.1, 378.12, 378.14

[56] References Cited

U.S. PATENT DOCUMENTS

| | | | |
|---|---|---|---|
| 3,054,637 | 9/1962 | Pambello | 297/256 X |
| 4,079,992 | 3/1978 | Thrift et al. | 297/17 X |
| 5,310,242 | 5/1994 | Golder | 297/256 X |
| 5,366,271 | 11/1994 | Johnston et al. | 297/378.12 X |
| 5,413,401 | 5/1995 | Koyanagi | 297/378.12 X |
| 5,478,096 | 12/1995 | Ting | 297/17 X |

*Primary Examiner*—Laurie K. Cranmer

[57] ABSTRACT

A baby chair for seating and securing children to the seat of an airplane or vehicle having an upper back support pivotally affixed to a seat via a hinge which greatly reduces the bulk during travel and storage. A locking mechanism is provided for securing the chair in both an open and closed position and a unique storage cavity with a removeable bag that allows a multiplicity of baby related items to be carried along during travel.

1 Claim, 8 Drawing Sheets

PORTABLE FOLDABLE BABY CHAIR

BACKGROUND

1. Field of the Invention: Generally, this invention is directed towards infant chairs that are used to seat babies and young children in vehicles and airplanes. More specifically, this invention is an improved baby chair that can easily be carried and used for storage of a plurality of baby items.

2. Description of the Prior Art:

One of the problems noticed when a women carries a baby chair along with her baby is the struggle of dealing with bulky space consuming baby chairs. It has been noticed that whenever a child is taken on travel that a plurality of baby related items must be taken along as well. Items such as a baby's bottle, diapers, and toys are very common. There are a multiplicity of baby chairs on the market and while some of the prior art may contain some similarities relating to the present invention, none of them teach, suggest or include all of the advantages and unique features of a baby chair that can easily be folded into a compact fashion and used for storage of a plurality of baby items. For the foregoing reasons, there is a need for baby chair that can easily be decreased in volume during transportation and be used for storing baby items.

SUMMARY

The present invention is directed towards a baby chair for holding and securing young children during auto and plane travel. The chair is also used to store a plurality of baby items that normally accompany children during travel.

Accordingly, it is an object of this invention to provide a baby chair that will seat and secure a young child during auto and plane travel.

Another object of this invention is to provide a baby chair that will fold into a more compact position thereby decreasing the bulk during transportation when the chair is not in use.

Still another object of this invention is to provide a baby chair that will create a storage cavity when in a folded position. The cavity allows for storage of a plurality of baby items that normally accompany travel.

Other objects and a fuller understanding of the invention will become apparent from reading the following detailed description of a preferred embodiment in conjunction with the accompanying drawings.

BRIEF DESCRIPTION OF THE DRAWINGS

This invention, together with other objects, features, aspects and advantages thereof, will be more clearly understood from the following description, considered in conjunction with the accompanying drawings.

Seven sheets of drawings are furnished, sheet one contains FIG. 1, two contains FIG. 2, sheet three contains FIG. 3, sheetour contains FIG. 4, sheet five contains FIG. 5, et six contains FIG. 6, and sheet seven contains FIG. 7

DESCRIPTION OF THE PREFERRED EMBODIMENTS

Figure 1:
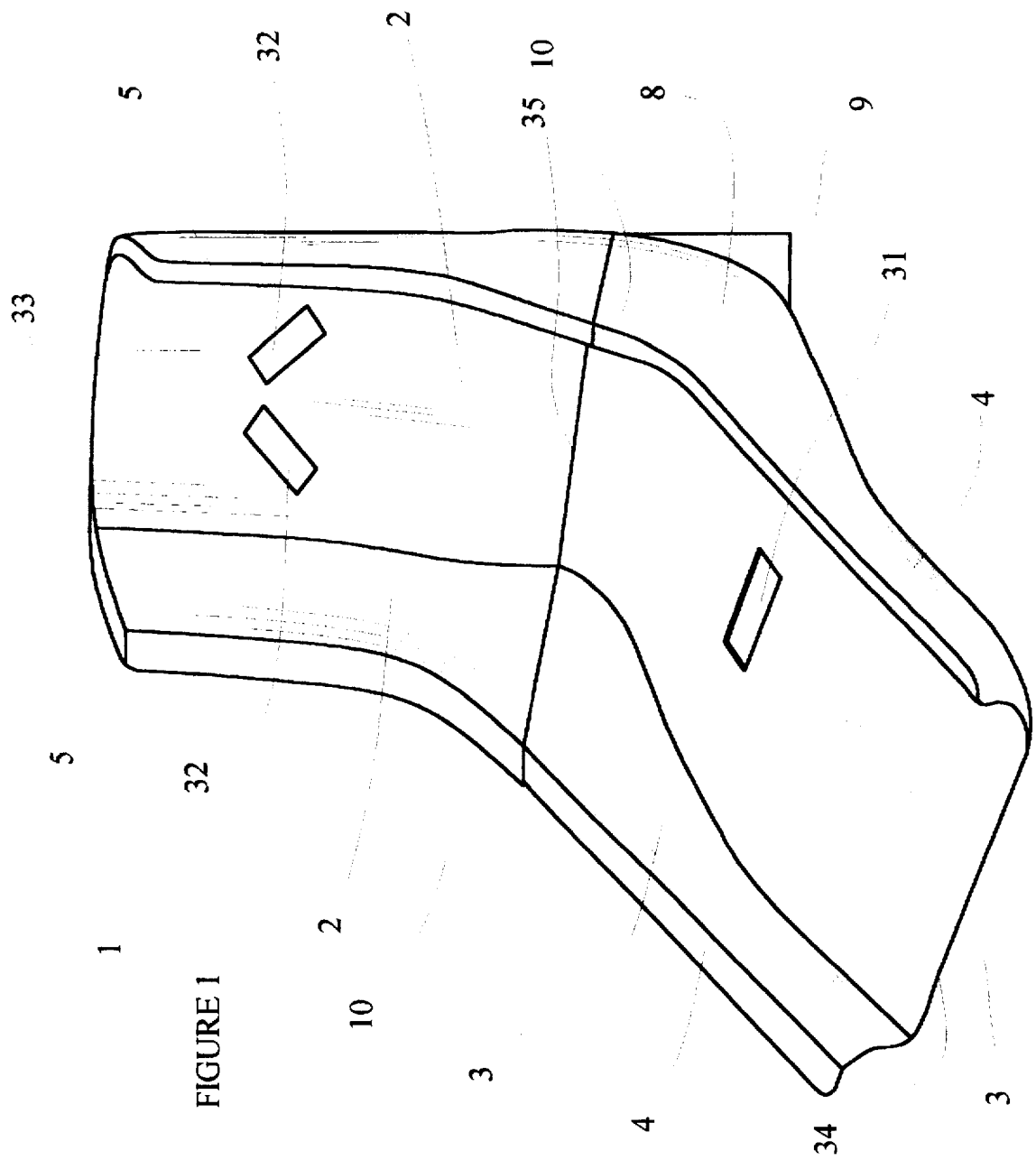
FIG. 1 is perspective view of the baby chair in a fully open position.

Referring now to FIG. 1, an apparatus for seating infants and storage of their belongings referred to generally by reference numeral 1. The apparatus 1 is made up primarily of an upper back support 2, a lower seat 3, and a hinge 10 that connects the two at each end. Along the perimeter of the upper back support 2 and lower seat 3 are grooves 5 and 4 that are used to secure a cushioned liner with elastic edges. Note, the cushioned liner is not shown in the Figures. At the upper portion of the support 2, are seat belt openings 32 that are used for allowing seat belt shoulder straps to be to inserted therein. Similarly, at the midsection of the seat is another opening 31 performing the same function. The upper back support 2, grooves 5 join the seat 3 and groves 4 ;at sections 35 and 10 respectively.

Figure 2:
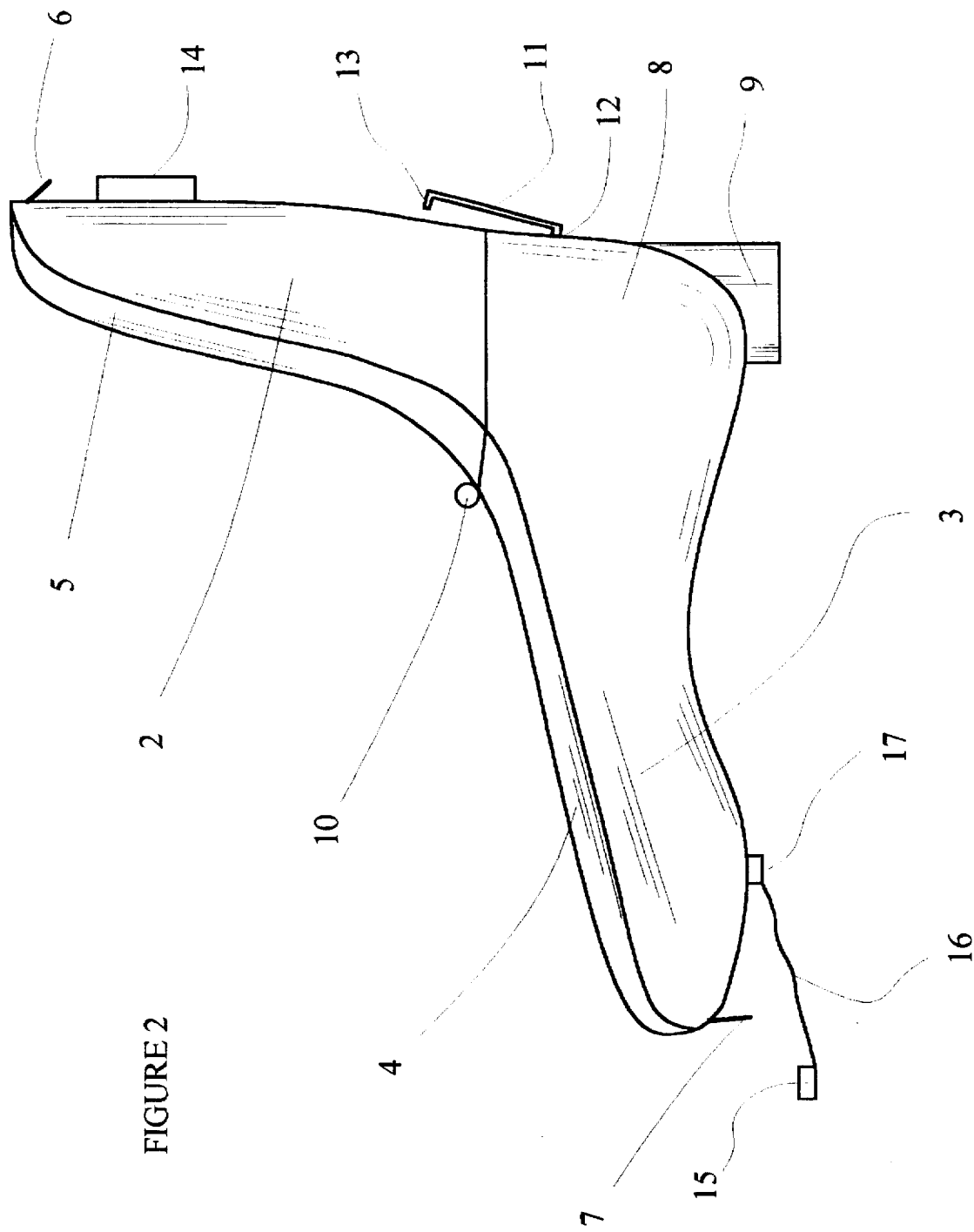
FIG. 2 shows a side view of the baby chair showing the bisecting point and the floor supporting member.

Referring now to FIG. 2, we see a side view of the chair in a fully open position. At the top edge 33 and bottom edge of the back support 2 and seat 3 are upper and lower hooks 6 and 7 that are used in conjunction with the grooves 4 and 5 for securing the chair liner thereto. Note the chair liner contains an elastic perimeter to fitting into hooks 6, 7 and grooves 4 and 5 respectively. A seat belt groove 14 is affixed to the upper portion of the back support 2. At the bottom of the seat 3 is a strap 16 connected to seat 3 via base 17. At the end of the strap 16 is a snap lock 15 for securing to base 17 when not in used and for securing to the back support when the apparatus is in a folded position. A hinge 10 is used for allowing the back support 2 and seat 3 to be pivotally connected to eachother. When the apparatus 1 is in a fully open position lock 11 with locking teeth 13 are used to secure the seat 3 and back support 2 together. The lock 11 is rigidly secured to seat 3 via locking base 12. At the bottom 30 and back side 8 of seat 3 is a floor support 9 that is used to give added balance to the apparatus when laid on the floor. The floor support 9 gives needed stability to the apparatus 1 to prevent the chair from falling over when a child is in it.

Figure 3:
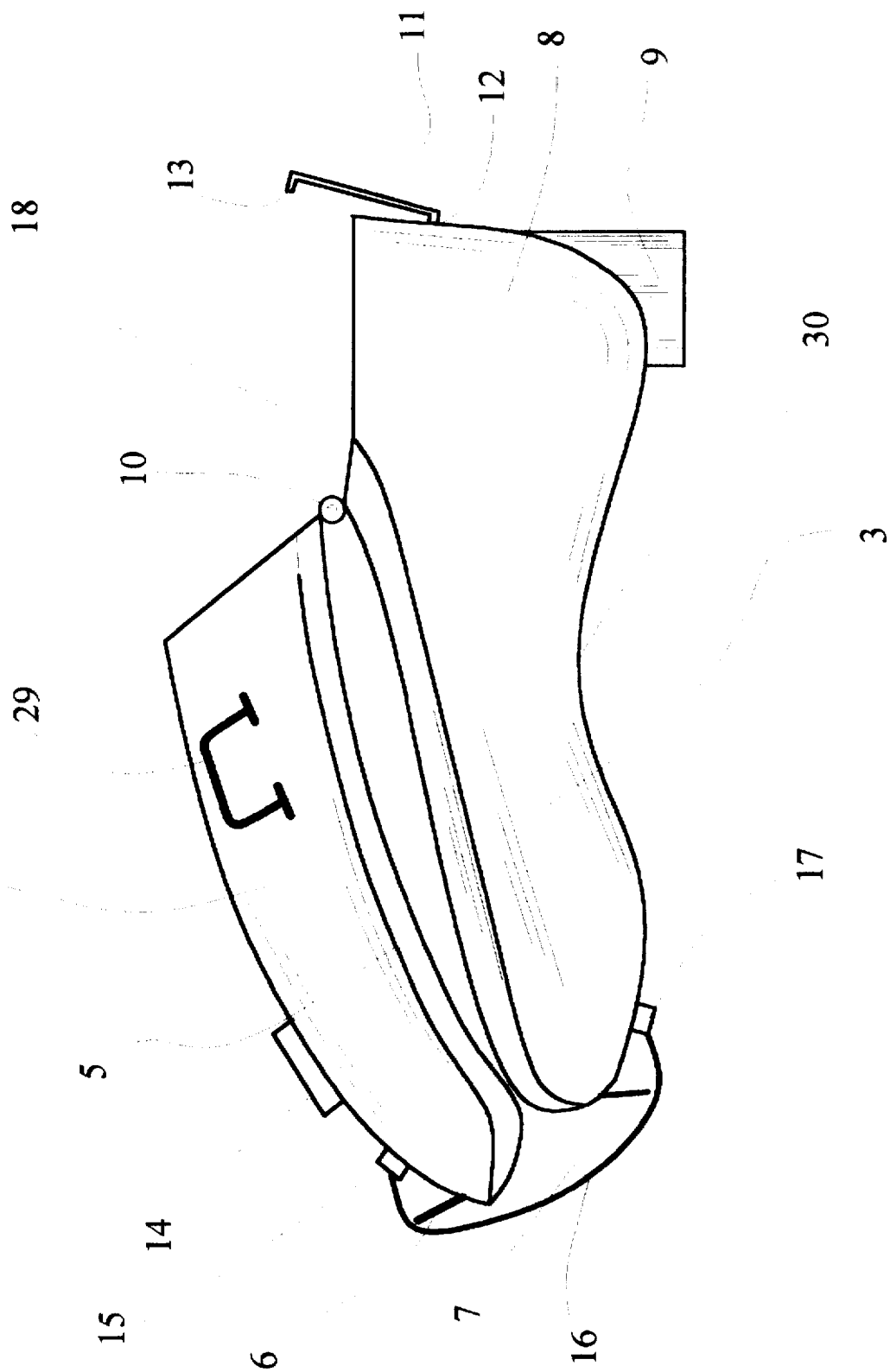
FIG. 3 show a side view of the baby chair in a fully folded position with the tie strap locking it shut.
Figure 4:
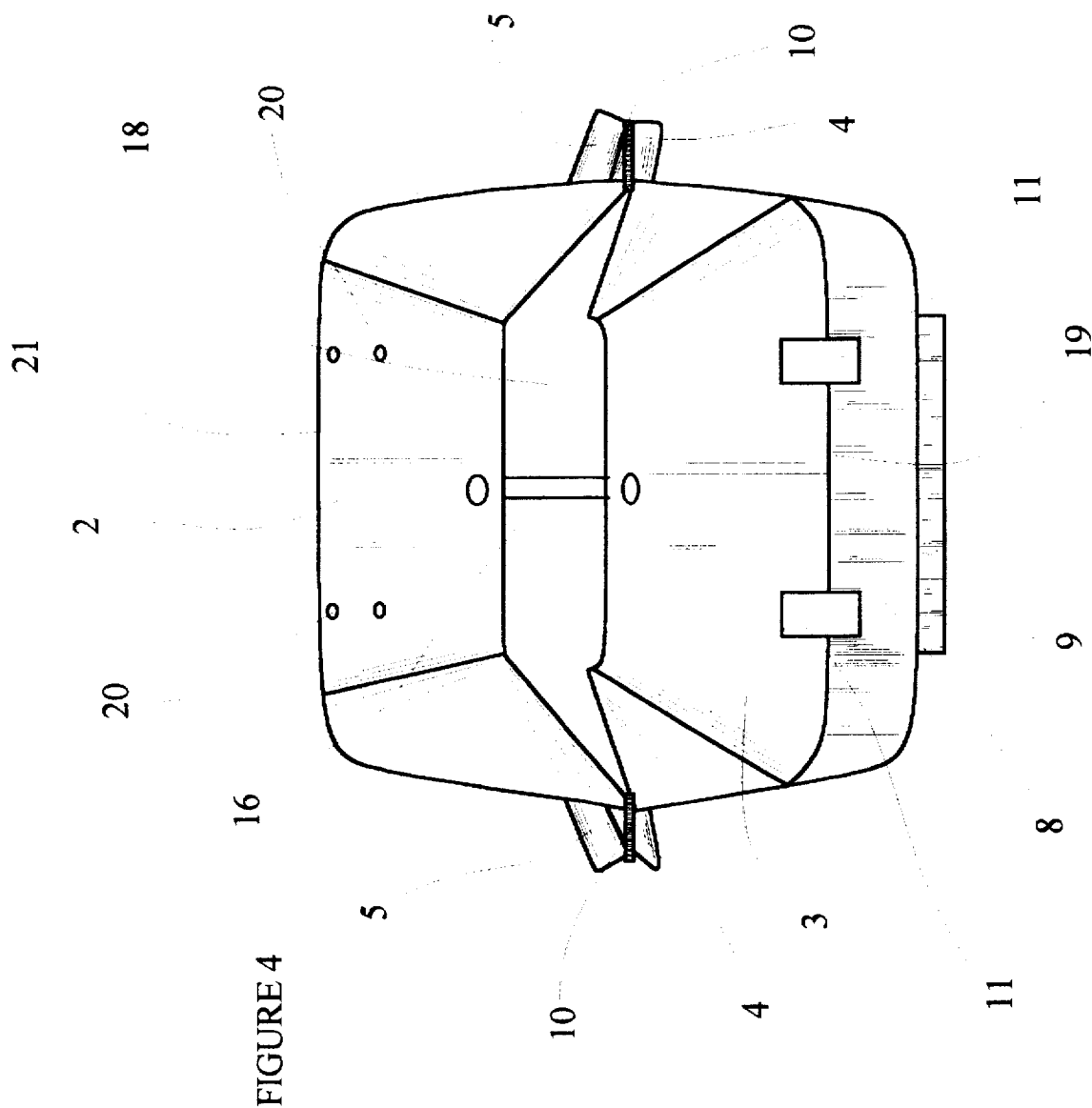
FIG. 4 sows the a rear view of the baby chair in a fulling folded position forming a cavity that is used for storage.
Figure 5:
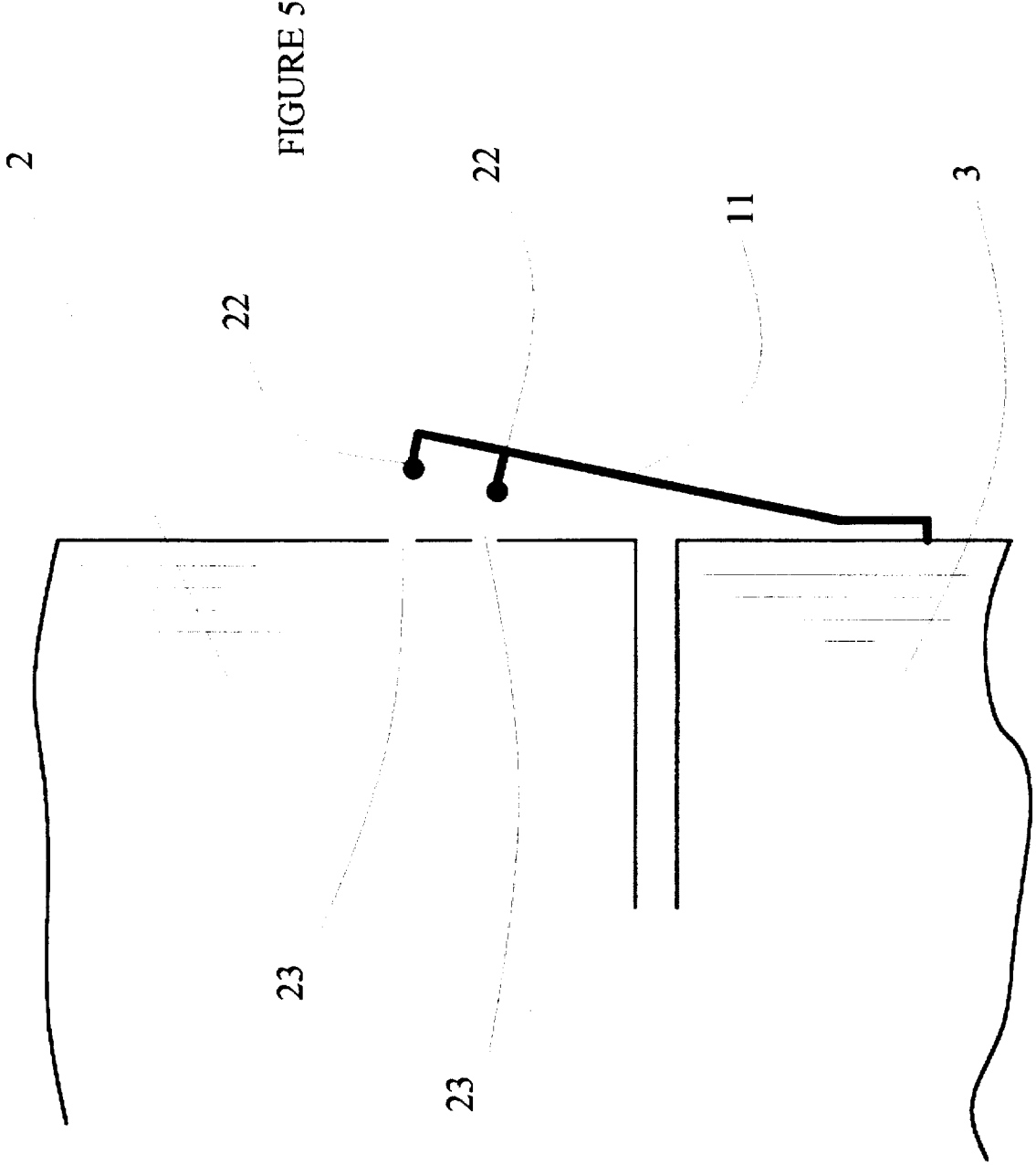
FIG. 5 shows a side cutaway view of the locking mechanism that is used to keep the chair locked in the fully open position.

FIG. 3 shows the apparatus 1 is a fully closed position creating mouth 18. At one side of the apparatus 1 is a handle 29 for allowing the apparatus to easily be carried around. When the apparatus 1 is in a fully closed position, the strap system is shown locking the seat 3 and back support 2 together. FIG. 4 shows a rear view of the apparatus 1 in a of fully folded position whereby the edges 19 and 21 of mouth 18 forms a cavity that is used for storage openings 20 and 23 are used to accept teeth 13 for securing the locking mechanism. The locking mechanism is more clearly shown in FIG. 5 which is a side cutaway view of the back support 2 and seat 3. Openings 23 are aligned to accept teeth 22 from lock 11. Note other means of securing the two parts the chair in a open position could easily be substituted.

Figure 6:
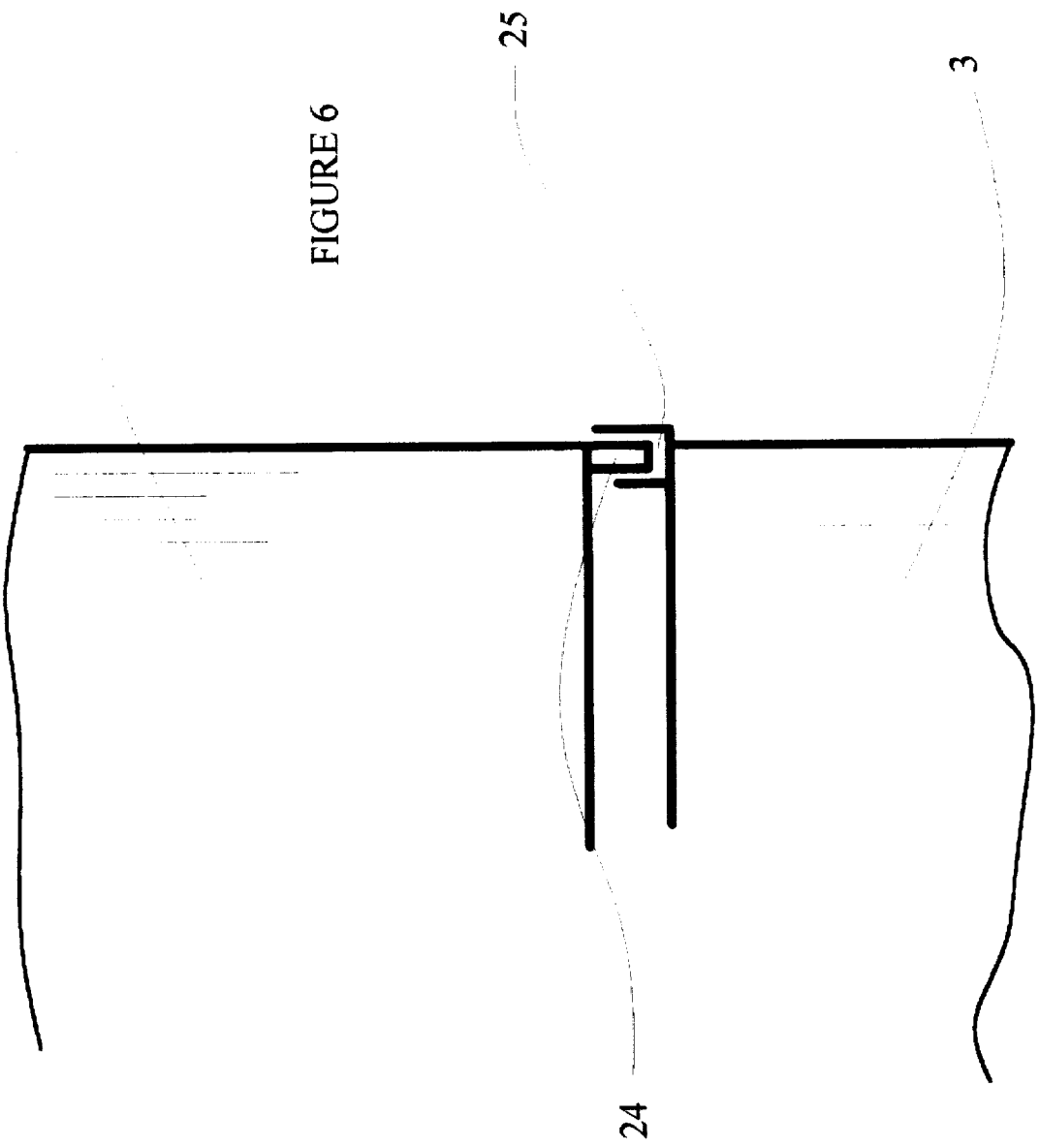
FIG. 6 shows a side cutaway view of the positive and negative edges that are used to align the chair when it is in a fully open position.
Figure 7:
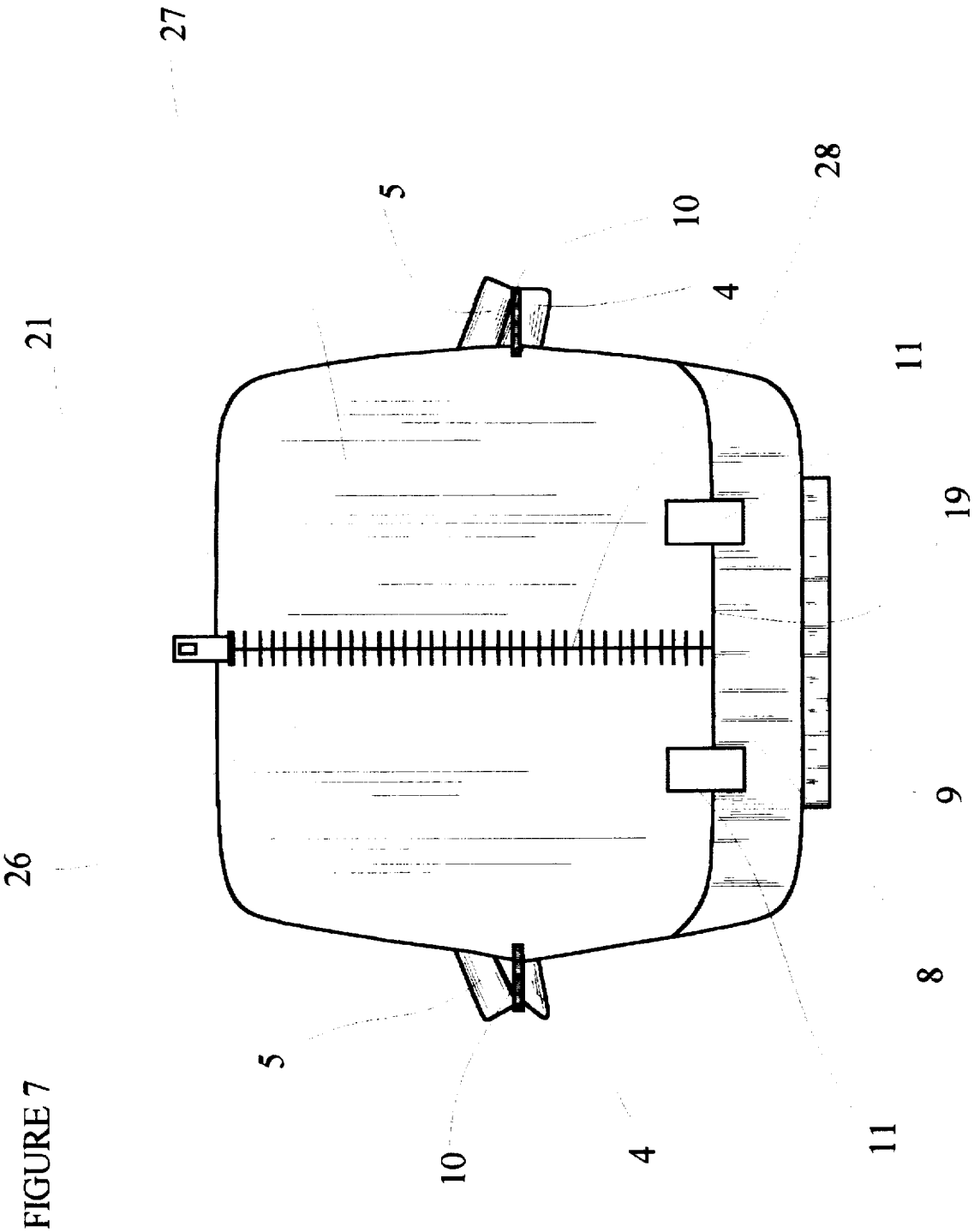
FIG. 7 shows a rear view of the chair having a storage container that lines the inside cavity of the baby chair when in a folded position.

When the apparatus 1 is in a fully open position, the back support 2 and seat 3 are aligned with eachother via positive edge 24 and negative edge 25 as shown in FIG. 6. FIG. 7 shows how the storage cavity formed when the back support 2 and seat 3 is closed via top covers 26 and 27. The covers 26 and 27 are joined by a zipper mechanism 28. An inside liner is used to line the inside of the cavity which prevents baby items from falling between the back support 2 and seat 3. The cavity could easily contain a complete separate bag that affixes along the mouth edges 19 and 21 of the cavity that could be removed when needed. The separate bag is also large enough to fit around the apparatus for concealing the chair during travel. The removable bag would be affixed simply by using a fastening means along the mouth of the cavity such as snaps or hook and loop material.

Figure 8:
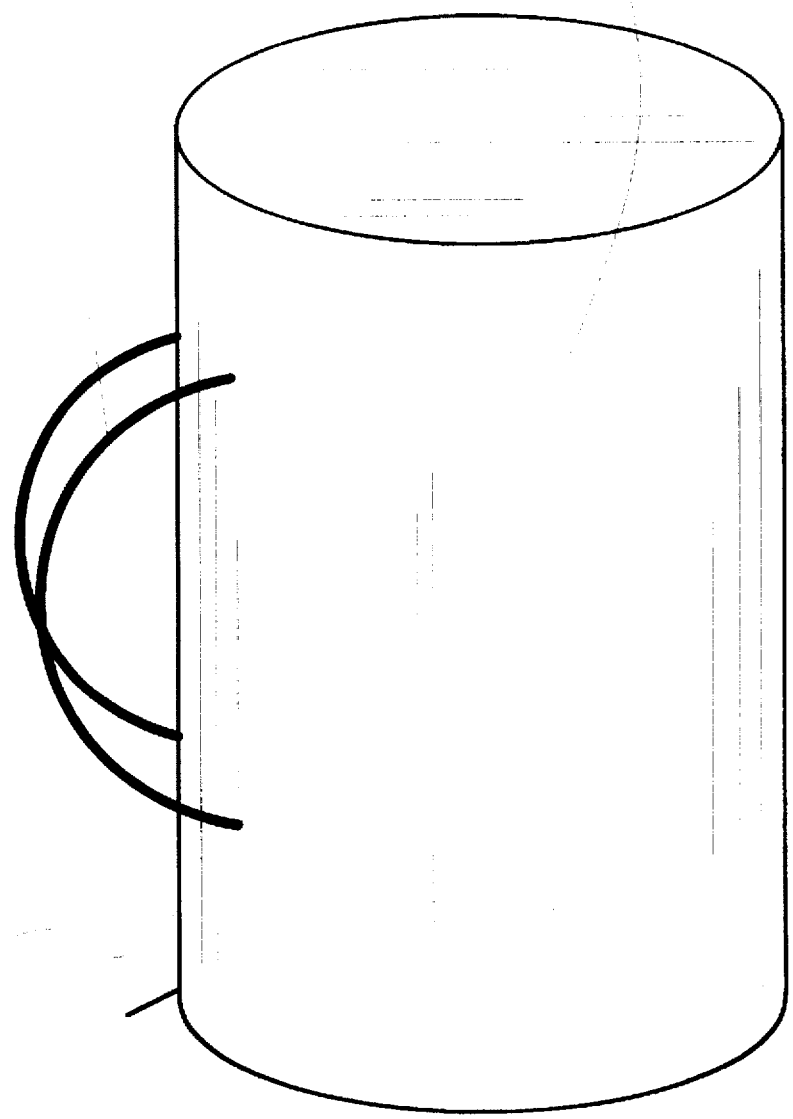
FIG. 8 shows a perspective view of an external carrying bag that is used to carry the apparatus and all of its accessories.

Many times babies tend to get the cushioned liners that cover the baby chairs dirty with food stains and other staining ingredients. It becomes embarrassing to carry these dirty chairs around, therefore, in FIG. 8, an additional carrying bag is used to carry and conceal the apparatus 1 during travel. The carrying bag consists of a handle 37, a zipper opening 36, and a elongated housing 38.

In carrying out this invention in the illustrative embodiment thereof, a person simply disconnects the locking mechanism 11 by pulling it out of the back support 2 and folding the back support 2 to the seat 3 via hinge 10. The strap 16 is then connected to the back support 2 to secure both halves together. If baby items are needed for storage, the items are simply inserted into the cavity of the chair and then closing the zipper 28 at the back.

Since minor changes and modifications varied to fit particular operating requirements and environments will be understood by those skilled in the art, the invention is not considered limited to the specific examples chosen for purposes of illustration, and includes all changes and modifications which do not constitute a departure from the true spirit and scope of this invention as claimed in the following claims and reasonable equivalents to the claimed elements.

What is claimed is:

1. A chair for seating children and securing to the seat of a vehicle comprising:

(a) an upper back support, said back support having a top edge, a bottom edge, a pair of lateral edges, and a back side, said back support having a groove affixed along edges of said lateral edges, a hook is affixed to the back side in close proximity to said top edge, (b) a seat pivotally affixed to said upper back support via a hinge, said seat having a bottom edge, a top edge and a pair of lateral edges, said top edge having a negative edge for accepting a positive edge of said bottom edge of said back support, said seat having a back side, said seat having a groove affixed along edges of said lateral edges, (c) a means of locking said back support and said seat together in a folded position, (d) a floor supporting member affixed to said bottom edge of said seat, (e) a means of locking said back support and said seat in a fully open position, (f) a storage cavity formed between said back support and said seat when said chair is in a folded position, said storage cavity having a given internal spatial dimension, (g) a storage bag having external spatial dimensions generally matching the internal spatial dimensions of said storage cavity thereby allowing said storage bag to be inserted into said storage cavity, said storage bag being removably affixed to said storage cavity, said storage bag having a sealable opening for allowing accessories to be inserted and removed.

* * * * *